Aug. 13, 1957     B. A. CURLEY     2,802,958
TERMINAL ARRANGEMENT FOR ELECTRIC APPARATUS
Filed May 28, 1956
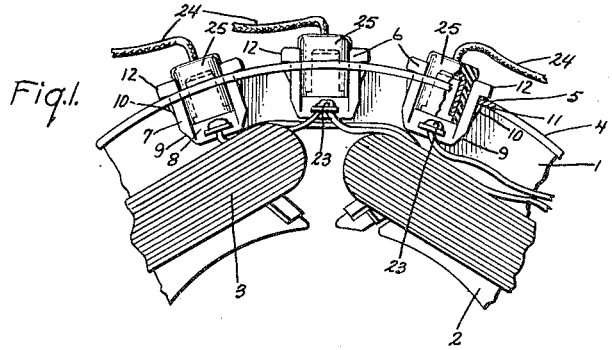
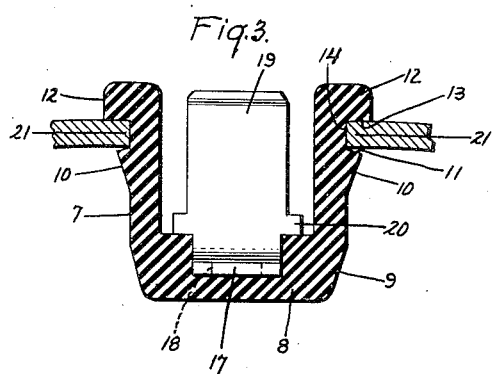
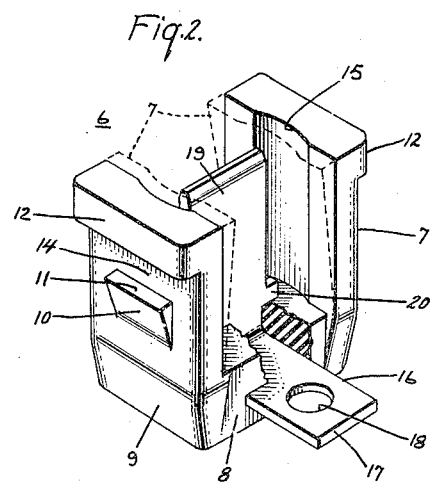
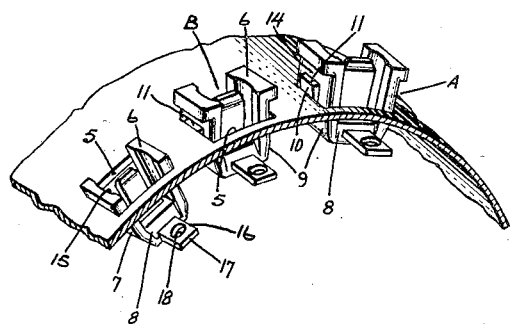
Inventor:
Bruce A. Curley,
by Robert G. Krug
His Attorney.

United States Patent Office 2,802,958
Patented Aug. 13, 1957

2,802,958
TERMINAL ARRANGEMENT FOR ELECTRIC APPARATUS

Bruce A. Curley, Fort Wayne, Ind., assignor to General Electric Company, a corporation of New York Application May 28, 1956, Serial No. 587,848

5 Claims. (Cl. 310—71)

This invention relates to electric apparatus, and more particularly to an improved terminal arrangement for such apparatus.

In order to provide the necessary electric power connections to electric apparatus such as dynamoelectric machines and transformers, they must be provided with some type of terminal arrangement whereby outside conductors may be electrically connected to the internal parts of the apparatus. Since such arrangements perform no positive function insofar as the operation of the apparatus itself is concerned, it is most desirable to keep the space they use and the expense of providing them to an absolute minimum. This is particularly true in the case of small dynamoelectric machines, and more particularly motors, where there is great commercial competition and where, consequently, even small changes in the cost or size of the motor can become important.

In the past, it has been customary to provide in such motors a terminal board of insulating material. The board was provided with the necessary terminals secured thereon, and was mounted in the motor. This arrangement was relatively expensive, requiring a special motor construction, and, further, usually resulted in the terminal being relatively inaccessible. This raised a further objection since, in addition to size and cost, it is most desirable, in the case of small electric motors, that the assembly of the terminal arrangement in the motor be easily effected, and that there be fast connection of outside conductors to the terminal arrangement. It is, consequently, most desirable to provide a terminal where the cost of the part itself is very low, assembly of the part in the motor is easy, there is little structural change or increase in the size of the motor attributable to the presence of the terminal, and outside connections can be made swiftly and easily.

It is, therefore, an object of this invention to provide improved terminal means for electric apparatus incorporating the desirable features described above.

A further object is the provision of a simple terminal arrangement economical to manufacture and easy to assemble in electric apparatus.

Another object of the invention is to provide a housing for electric apparatus which, combined with the improved terminal arrangement, will provide for easy assembly of the terminal arrangement in a position conveniently accessible from without the housing.

In one aspect thereof, the invention provides, in electric apparatus, a housing member with at least one opening formed therein. A substantially U-shaped terminal-supporting member formed of springy insulating material is arranged in the opening with its legs extending outwardly therethrough. Each leg of the U-shaped member has a recess formed on its outer side intermediate the ends, and the edges of the housing member opening extending into the recesses so as to lock the U-shaped member in position. The U-shaped member has a terminal which it supports so that a portion of the terminal is accessible from outside the opening.

The features of the invention which are believed to be novel are set forth with particularity in the appended claims. The invention, itself, however, together with further objects and advantages thereof, may best be understood by reference to the following detailed description taken in connection with the accompanying drawing.

In the drawing, Figure 1 is a fragmentary end view of an electric motor incorporating the improved terminal arrangement of this invention;

Figure 2 is a view in perspective, partly broken away and partly in cross section, of the improved terminal-supporting member of the invention;

Figure 3 is an enlarged side view in cross section of the improved terminal means in cooperation with the housing of the motor; and Figure 4 is a fragmentary view in perspective illustrating the assembly of the improved terminal means in the dynamoelectric machine housing.

Referring now to the figures of the drawing, there is shown by way of example a dynamoelectric machine which may be, as shown in Figure 1, a shaded-pole induction motor provided with a stator 1 having salient poles 2 with coils 3 formed on the poles. Stator 1 is secured within a housing member 4 which has a plurality of openings 5 of the type frequently provided for ventilation purposes formed therein. A U-shaped terminal-supporting member 6, formed of insulating material, such as, for instance, nylon or a hard grade of rubber, is provided with legs 7 and a bight 8. Each leg 7 has its outer surface formed, as shown, with a chamfered portion 9 at the bight end, a portion 10 intermediate the ends which tapers outwardly as the outer end of leg 7 is approached and which terminates in a surface 11, and an outwardly extending lip 12 at the outer end having an undersurface 13. Surfaces 11 and 13 form between them a recess 14 whose function, together with the functions of the other parts of the outside surface of each leg 7, will be explained herebelow. The inner surface of each leg 7 may have a curved recess 15 extending from the upper edge thereof downwardly substantially to the bottom of the leg, as shown, for a purpose to be described herebelow.

Member 6 is arranged to support suitable terminal means which, in the present instance, are of the quick-connect variety, and consist of a substantially L-shaped terminal member 16. Terminal 16 is embedded in member 6, as shown; it has a portion 17 with an opening 18 extending from the bight 8 so as to be accessible from within the motor, and a male terminal portion 19 extending outwardly between legs 7 so as to be accessible from outside the motor. Male portion 19 may be provided at its base with flange portions 20.

To assemble member 6 within an opening 5, it is introduced bight first as shown at A in Figure 4. Where chamfered portions 9 are provided, as in the present embodiment, the entry of member 6 into opening 5 is facilitated by the tendency of the chamfered portions to guide the member into the opening. When member 6 has been inserted into opening 5 sufficiently so that tapered portion 10 of each leg 7 starts to engage the edges 21 of the opening 5, legs 7 are forced toward each other as shown in phantom in Figure 2 and at B in Figure 4. When insertion of member 6 into opening 5 has proceeded sufficiently so that portion 10 is moved past edge 21, the resilient nature of the configuration of member 6 will make it snap back to its previous form so that each edge 21 will be engaged in a recess 14. In this manner, member 6 is locked into opening 5 by the cooperation of surfaces 11 and 13 of members 10 and 12 respectively with each edge 21.

Once each member 6 is in position in an opening 5, as described, proper connections of the coils 3 are made to the terminal members 16. This is effected by securing a coil end 22 within opening 18 of terminal portion 17 by any desired means such as, for instance, soldering as shown at 23. With the terminal arrangement of the motor completed, it is then an exceedingly simple matter to effect the external connections to the motor in order to provide energization of coils 3. With the particular type of quick-connect terminal illustrated, external conductors 24 provided with female terminals 25 are electrically connected to the coils by engagement of a female terminal 25 over a male terminal portion 19 until it abuts flanges 20. Where legs 7 are provided with recesses 15 on their inner surfaces, the assembly of the female terminals 25 is facilitated even further since each female terminal is guided over the male terminal by the recesses. At this point, the connection to the outside source of power is complete.

It will be seen from the foregoing that the terminal arrangement provided is simple, compact, and very easy to assemble. In many cases, it will not be necessary to provide any additional facilities in the motor since openings 5 may very well already be present for other purposes such as ventilation of the motor.

While this invention has been explained by describing a particular embodiment thereof, it will be apparent that improvements and modifications may be made without departing from the scope of the invention as defined in the appended claims. By way of example only, while a substantially square U-shaped member 6 has been shown, the U may approach the V in effect without departing from the essence of the invention. Another obvious modification lies in the provision of a different type of terminal instead of the particular type described.

What I claim as new and desire to secure by Letters Patent of the United States is:

1. In electric apparatus, a housing member having an opening formed therein, a substantially U-shaped terminal-supporting member of hard springy insulating material arranged with the legs thereof extending outwardly through said opening, each said leg having a recess formed on its outer side intermediate the ends thereof, the edges of said housing member opening extending into said recesses thereby to lock said U-shaped member in position, and a terminal supported by said U-shaped member and having a portion accessible from outside said opening.

2. A substantially U-shaped terminal-supporting member of hard springy insulating material having a pair of legs each provided with a recess formed on its outer side intermediate the ends thereof, and a terminal supported by said U-shaped member and having a portion positioned between said legs.

3. In electric apparatus, a housing member having an opening formed therein, a substantially U-shaped terminal-supporting member of hard springy insulating material arranged with the legs thereof extending outwardly through said opening, each said leg having a lip formed substantially at the outer end thereof on its outer side and having a portion intermediate the ends thereof on the outer side tapering outwardly as the outer end of said leg is approached, said tapering portion terminating a predetermined distance from said lip thereby to form a recess therewith, the edges of said housing member opening extending into said recesses thereby to lock said U-shaped member in position, and a terminal supported by said U-shaped member and having a portion accessible from outside said opening.

4. A substantially U-shaped terminal-supporting member of hard springy insulating material, each leg of said U-shaped member having a lip formed at the outer end thereof on the outer side thereof and having a portion intermediate the ends thereof on the outer side tapering outwardly as the outer end thereof is approached, said tapering portion terminating a predetermined distance from said lip thereby to form a recess therewith, and a terminal supported by said U-shaped member and having a portion positioned between said legs.

5. In an electric motor, a housing member having a rectangular opening formed therein, a substantially U-shaped terminal-supporting member of hard springy insulating material arranged with the legs thereof extending outwardly through said opening, each said leg having a lip formed at the outer end thereof on the outer side and having a portion intermediate the ends thereof tapering outwardly as the outer end thereof is approached, said tapering portion terminating a predetermined distance from said lip thereby to form a recess therewith, the two opposite edges of said housing member opening extending into said recesses thereby to lock said U-shaped member in position, and a quick-connect terminal embedded in the bight of said U-shaped member, said terminal having a portion accessible from within said motor, said terminal further having a male portion extending outwardly from said bight between said legs so as to be accessible from outside said opening.

References Cited in the file of this patent

UNITED STATES PATENTS

| | | |
|---|---|---|
| 1,555,094 | Adams | Sept. 29, 1925 |
| 2,441,907 | Schmitt | May 18, 1948 |
| 2,511,693 | Burghoff | June 13, 1950 |
| 2,694,798 | Cole | Nov. 16, 1954 |
| 2,711,522 | Goodwin | June 21, 1955 |

FOREIGN PATENTS

| | | |
|---|---|---|
| 722,142 | Great Britain | Jan. 19, 1955 |